United States Patent [19]

Brearley et al.

[11] 4,260,200
[45] Apr. 7, 1981

[54] ANTI-LOCK BRAKE CONTROL SYSTEM

[75] Inventors: Malcolm Brearley, Solihull; Alfred. K. White, Kings Heath, both of England

[73] Assignee: Girling Limited, Birmingham, England

[21] Appl. No.: 893,610

[22] Filed: May 11, 1978

[51] Int. Cl.³ .............................................. B60T 8/08
[52] U.S. Cl. .................................... 303/97; 303/105; 303/110
[58] Field of Search ................. 188/181; 303/20, 97, 303/103, 105, 106, 110

[56] References Cited

U.S. PATENT DOCUMENTS

| | | | |
|---|---|---|---|
| 3,578,819 | 5/1971 | Atkins | 303/20 UX |
| 3,584,921 | 6/1971 | Crawford | 303/20 X |
| 3,707,311 | 12/1972 | Sharp | 303/97 |
| 3,790,227 | 2/1974 | Dozier | 303/20 X |
| 3,820,857 | 6/1974 | Schnaibel et al. | 303/20 X |
| 3,951,467 | 4/1976 | Fleagle | 303/20 X |
| 3,964,796 | 6/1976 | Bremer | 303/20 X |
| 3,966,266 | 6/1976 | Atkins | 303/20 X |
| 4,036,536 | 7/1977 | Quon | 303/105 X |

Primary Examiner—Trygve M. Blix
Assistant Examiner—Reinhard J. Eisenzope
Attorney, Agent, or Firm—Scrivener, Clarke, Scrivener and Johnson

[57] ABSTRACT

An anti-lock brake control system for a vehicle with braked wheels comprises a sensor to produce a signal proportional to the deceleration/acceleration of the braked wheel, a deceleration sensing switch to respond to the deceleration/acceleration signal by producing a brake pressure release pulse when deceleration of the wheel exceeds a predetermined threshold level, a charge storage device which is adapted so that it charges in a predetermined progressive manner while the brake pressure release pulse is produced and discharges at a predetermined decay rate, a comparator that compares the potential on the charge storage device with a reference potential and produces an extension brake pressure release pulse according to their relative values, and apparatus to vary one of said potentials in a manner dependent on acceleration of the wheel above a preset acceleration threshold so that the extension brake pressure release pulse is terminated by increasing wheel acceleration. In one embodiment, the apparatus varies the reference potential so that the change of the reference potential with increasing acceleration is in the same sense as the change in the potential on the charge storage device when charging, the comparator producing said extension pulse only while the potential on the charge storage device exceeds the fixed reference potential. In another embodiment, the apparatus varies the potential on the charge storage device by discharging the latter after it has been charged from a fixed starting potential, the comparator producing an extension pulse as soon as the potential on the charge storage device exceeds a fixed reference potential and terminating the extension pulse once the potential on the charge storage device falls to a fixed terminating potential above the fixed reference potential.

1 Claim, 6 Drawing Figures

ANTI-LOCK BRAKE CONTROL SYSTEM

This invention relates to an anti-lock brake control system for vehicles with braked wheels.

Anti-lock brake control systems prevent or minimise wheel lock-up by sensing incipient lock-up and then releasing brake pressure until the wheel recovers in speed and then re-applying the brake pressure and repeating the cycle as often as necessary. It is known to detect incipient wheel lock-up by producing an electrical wheel speed signal and feeding this to a deceleration/acceleration sensing switch which fires and produces a brake pressure release pulse when the wheel deceleration exceeds a preset threshold. Release of the brake pressure allows the wheel to recover in speed towards a synchronous running condition in which there is no wheel slip, but this recovery is delayed and as a result there is a progressive increase in the departure of the actual wheel speed from the synchronous wheel speed before the wheel stops decelerating and begins to accelerate towards the synchronous condition.

In order to optimise braking effectiveness, it is known to delay the re-application of brake pressure until the wheel is accelerating towards the synchronous condition. This is achieved in a known system by providing a deceleration/acceleration sensing switch comprising a transistor switch with an input capacitor through which the wheel speed signal is applied to the switch so as to determine said predetermined deceleration threshold at which the transistor conducts to produce the brake pressure release pulse. The charge stored by the input capacitor, which is in effect a measure of the wheel slip or skid, controls re-setting of the transistor switch and thus termination of the brake pressure release pulse, the stored charge decaying both in step with the increase in wheel speed and at a preset constant rate determined by the switch input current, and eventually re-setting the switch at a predetermined charge level. Thus, the deeper the dip in the wheel speed, the larger will be the stored slip charge and the longer the brake pressure release pulse for a particular wheel recovery acceleration; the greater the wheel recovery acceleration, the shorter will be the brake pressure release pulse.

A disadvantage with this known system is that said predetermined deceleration threshold limits the charge decay rate, and therefore limits the length of the brake pressure release pulse. Therefore, under certain conditions, particularly very low $\mu$ conditions with lightly loaded wheels, the brake pressure release pulse may not be long enough to ensure full wheel speed recovery before the brakes are re-applied.

Another anti-lock brake control system has been proposed in which a signal proportional to the rate of change of wheel speed is fed via a diode to a capacitor so that the capacitor is charged to a potential corresponding to the deceleration of the wheel; and a Schmitt trigger circuit is provided that is triggered by the potential on the capacitor when this reaches a level corresponding to said predetermined deceleration threshold, the trigger circuit then producing said brake pressure release pulse. The capacitor is discharged at a constant rate so that the potential on the capacitor starts to fall once the wheel deceleration peak has passed, and is also discharged in a manner related to wheel acceleration so that the capacitor is discharged more rapidly with more rapid wheel speed recovery, the Schmitt trigger circuit being re-set to terminate the brake pressure release pulse once the potential on the capacitor reaches said predetermined threshold level.

The constant rate of discharge of the capacitor can be set as low as desired so that there is no limitation on the length of the brake pressure release pulse that this system can produce, but this system is instead dependent on the occurrence of wheel acceleration to shorten the brake pressure release pulse in the event of rapid wheel speed recovery. However, under certain conditions, particularly high $\mu$ conditions, brake pressure release following detection of incipient wheel lock may produce a short, sharp deceleration peak with little or no recovery acceleration before the wheel speed recovers to the synchronous speed corresponding to the instantaneous speed of the rapidly decelerating vehicle. Under these conditions, the capacitor will be charged to a high potential corresponding to the high deceleration peak and will only be discharged at the constant rate so that a long brake pressure release pulse will be produced when a much shorter pulse would be appropriate for optimum braking efficiency.

The object of the present invention is to provide an anti-lock brake control system in which the aforesaid disadvantages of the known systems are reduced or overcome, that is, a system which is adapted for operation on very low $\mu$ surfaces without adversely affecting operation on high $\mu$ surfaces.

Broadly, the invention consists in an anti-lock brake control system including a deceleration sensing switch that responds to deceleration of the braked wheel by producing a brake pressure release pulse when said wheel deceleration exceeds a predetermined threshold level, and in which an extension pulse circuit is provided that operates in accordance with the duration of wheel deceleration and with wheel speed recovery to produce a brake pressure release pulse to extend brake release as necessary after termination of said brake pressure release pulse from said deceleration sensing switch. The duration of wheel deceleration is used to produce a wheel acceleration requirement which while not met, produces an extension pulse and which is reduced in a predetermined manner with time while the extension pulse is produced so as to precipitate brake re-application.

The provision of the pulse extension circuit ensures that the basic brake pressure release pulse is extended as necessary under low $\mu$ conditions when wheel speed recovery is slow, and the fact that the duration of the wheel deceleration peak rather than its amplitude, is used to control such extension, ensures that short, sharp deceleration peaks under high $\mu$ conditions only set a low or nil acceleration requirement that will be met by little or no wheel acceleration after said deceleration peak.

In particular, the present invention consists in an anti-lock brake control system for a vehicle with braked wheels comprising sensor means to produce a signal proportional to the deceleration/acceleration of the braked wheel, a deceleration sensing switch to respond to the deceleration/acceleration signal by producing a brake pressure release pulse when deceleration of the wheel exceeds a predetermined threshold level, a charge storage device which is adapted so that it charges in a predetermined progressive manner while the brake pressure release pulse is produced and discharges at a predetermined decay rate, comparator means that compares the potential on the charge storage device with a reference potential and produces an extension brake pressure release pulse according to their relative values, and means to vary one of said potentials in a manner dependent on acceleration of the wheel above a preset acceleration threshold so that the extension brake pressure release pulse is terminated by increasing wheel acceleration.

The charge storage device, comparator means and potential varying means form said pulse extension circuit, the potential on the storage device providing said acceleration requirement that decays with time.

In one embodiment of the invention, the reference potential is varied with wheel acceleration and is compared with the potential on the capacitor, an extension release pulse being produced if a particular one of the potentials exceeds the other, indicating that wheel speed recovery is not sufficient following the deceleration peak. However, the subsequent change in the reference potential with increasing wheel acceleration and the decay of the capacitor potential eventually causes both potentials to become equal, indicating that a satisfactory degree of wheel speed recovery has been achieved, whereupon the comparator operates to terminate the extension release pulse.

In another embodiment of the invention, the potential on the capacitor is varied by discharging the capacitor in a manner dependent on wheel acceleration, and this potential is compared with a fixed reference potential, an extension release pulse being produced while one potential exceeds the other, indicating insufficient wheel speed recovery.

Under some conditions, wheel speed recovery can be so slow that the relative values of the capacitor potential and reference potential are never such as to terminate the extension release pulse. In order to allow for this, means is preferably provided to detect synchronous running of the wheel and to terminate the extension release pulse when this occurs.

The invention will now be described by way of example with reference to the accompanying drawings in which.

Figure 1:
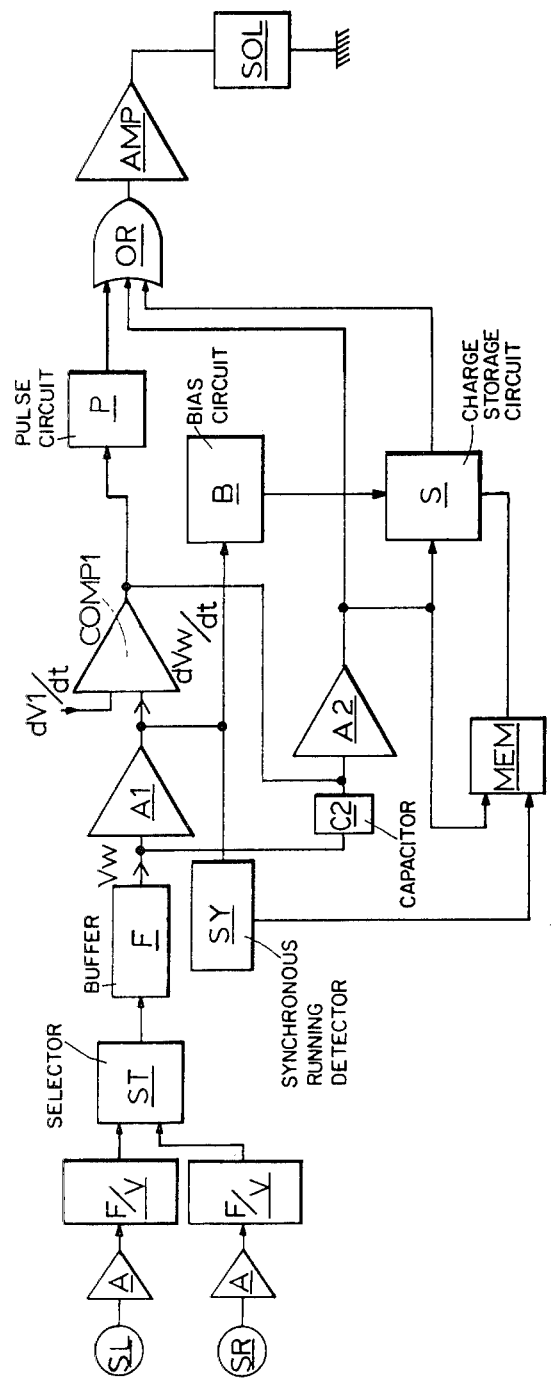
FIG. 1 is a schematic diagram of one embodiment of the invention.
Figure 2:
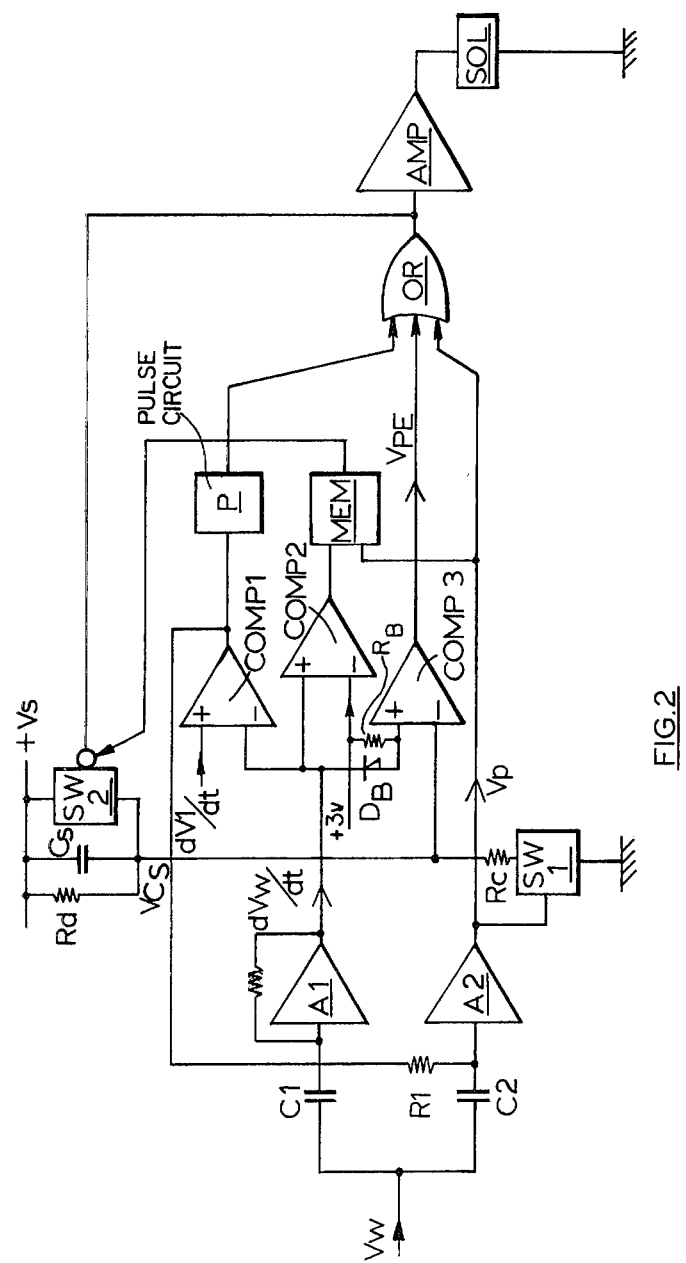
FIG. 2 is a circuit diagram of part of the system shown in FIG. 1.
Figure 3:
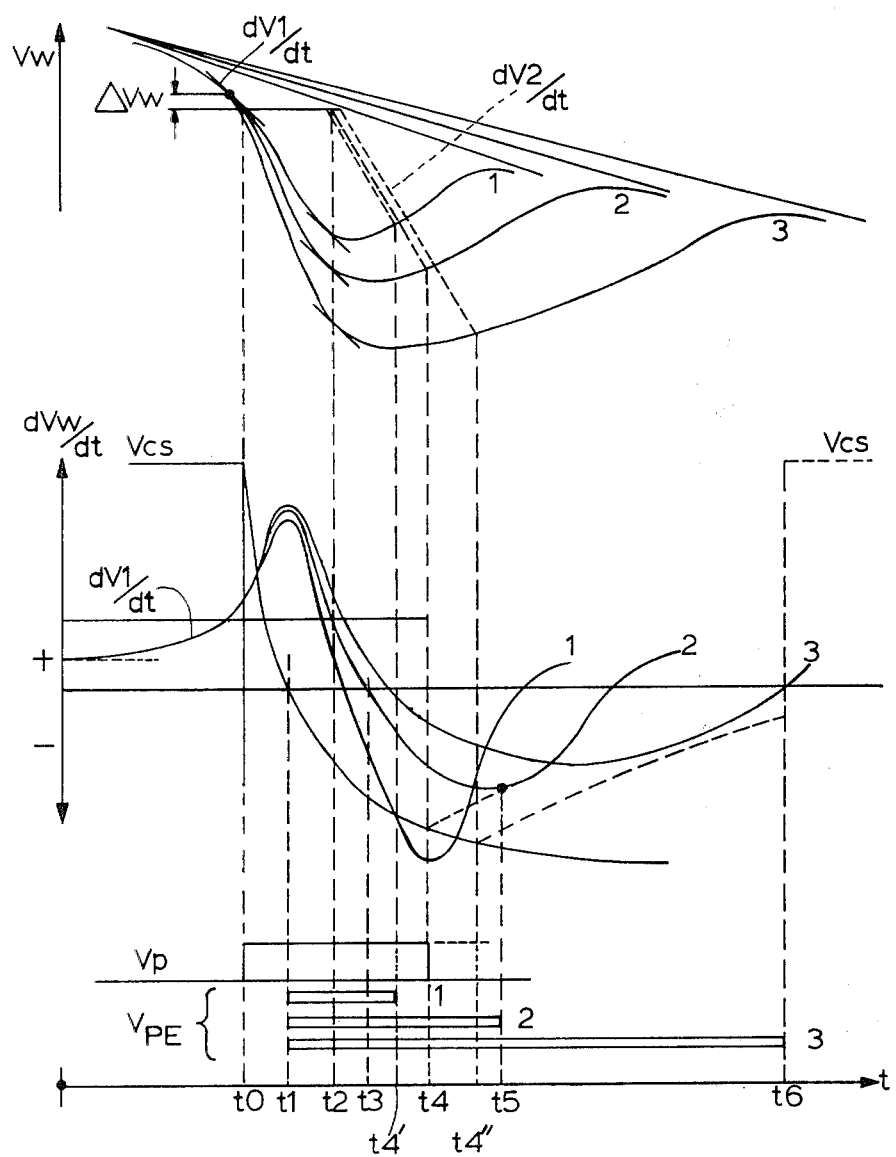
Figure 4:
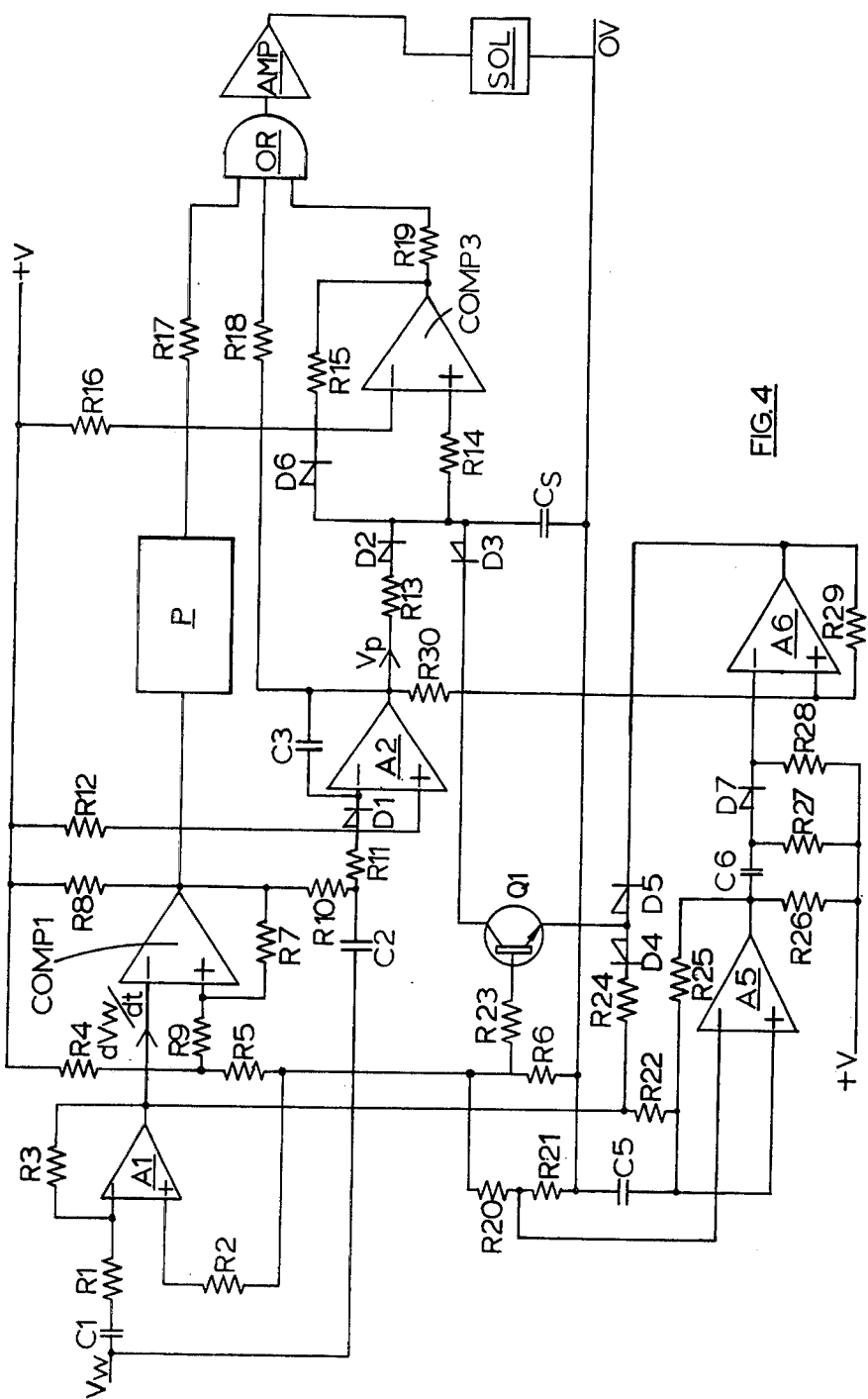
Figure 5:
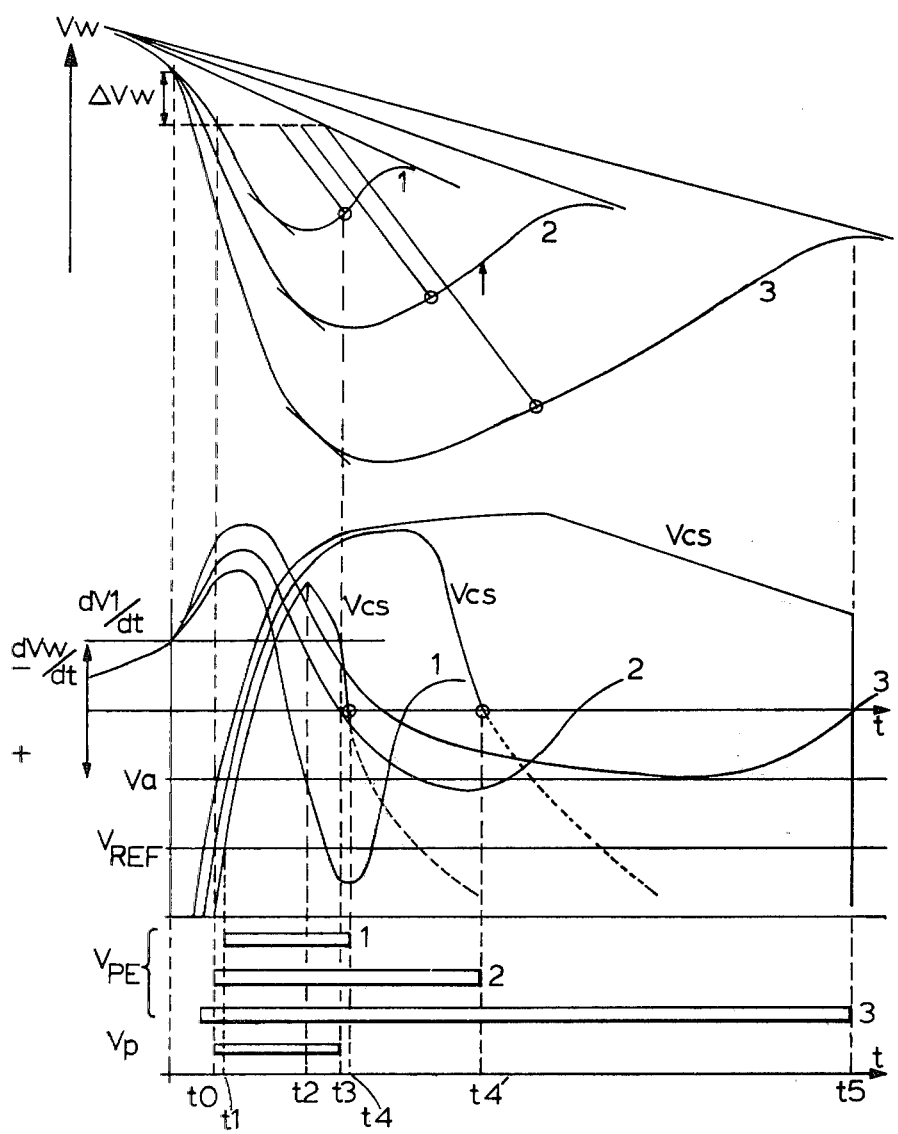
Figure 6:
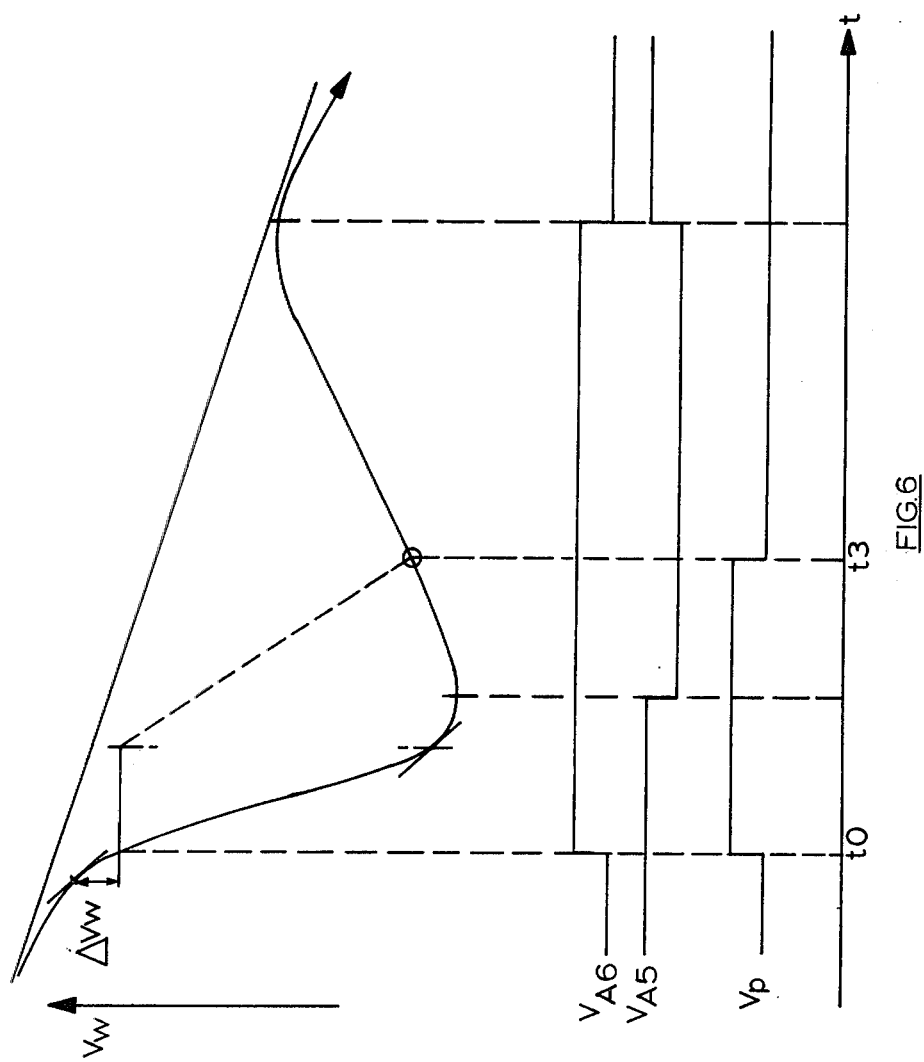

FIG. 3 shows wheel speed curves, wheel deceleration/acceleration curves and extension release pulses for the embodiment of FIGS. 1 and 2, FIG. 4 is a circuit diagram of an alternative embodiment of the invention, FIG. 5 shows wheel speed curves, wheel deceleration curves and extension release pulses for the embodiment of FIG. 4, and FIG. 6 illustrates how the synchronous running detector in FIG. 4 operates.

The anti-lock brake control system illustrated in FIG. 1 comprises two wheel speed sensors SL and SR, each associated with the left and right hand wheels, respectively, on a vehicle axle so as to produce a pulse signal with a repetition frequency proportional to the angular speed of the wheel. Each pulse signal is amplified in an amplifier A and converted into a voltage signal $V_w$ proportional to wheel speed in a frequency/voltage converter F/V. The lower of these wheel speed signals $V_w$ is selected in a selector circuit ST and is fed via a buffer circuit F to a differentiator A1, the buffer circuit F including circuitry that blocks the signal $V_w$ below a minimum acceptable wheel speed. The differentiator A1 acts on the wheel speed signal $V_w$ and produces a deceleration/acceleration signal $dV_w/dt$ that is fed to a comparator COMP1 in which it is compared with a reference deceleration signal $dV1/dt$ so that the comparator COMP1 produces an output pulse when the deceleration signal $dVw/dt$ exceeds the deceleration threshold $dV1/dt$. This output pulse triggers a pulse circuit P and causes the latter to produce a brake pressure release pulse that passes via an OR gate and an amplifier AMP and energises a solenoid SOL to release brake pressure. The pulse circuit P limits the length of the brake pressure release pulse and includes an inhibit timing circuit that limits the frequency with which the brake pressure release pulse can be produced.

The differentiator A1 and comparator COMP1 form a first deceleration sensing switch with a fast response that produces a brake pressure release pulse of limited duration and frequency, these limitations serving to prevent repetitive brake pressure release in response to deceleration signals produced by rough road conditions. The pulse circuit P and inhibit circuit I form the subject of our co-pending U.S. Patent Application Ser. No. 893,799 and are described in more detail therein.

The wheel speed signal $V_w$ is also fed to a second deceleration sensing switch A2 with a slower response than said first deceleration sensing switch, the second switch including a capacitor C2 through which the wheel speed signal $V_w$ is applied to the switch A2 and which has a control connection from the output of the comparator COMP1. The control connection determines the deceleration threshold at which the second switch is triggered and produces a brake pressure release pulse that passes via the OR gate and amplifier AMP to energise the solenoid SOL. The deceleration threshold is $dV2/dt$ when the comparator COMP1 does not produce an output pulse, this threshold being equal to or greater than said threshold $dV1/dt$ for the first deceleration sensing switch. However, when the comparator COMP1 produces an output pulse once the threshold $dV1/dt$ is exceeded, this output pulse removes the threshold $dV2/dt$ and allows the second switch A2 to be triggered as soon as a preset fall in wheel speed $\Delta V_w$ occurs.

The capacitor C accumulates a charge dependent on the dip in the wheel speed while the second deceleration switch A2 is triggered. Decay of this charge is restricted by the output pulse from the comparator COMP1, but once this pulse has terminated the charge decays at a predetermined rate $dV2/dt$ and in step with the increase in wheel speed until a predetermined charge level is reached at which the switch A2 resets, terminating the brake pressure release pulse.

The two deceleration sensing switches thus form a dual channel control system in which the first switch performs a rapid response, brake pressure release action of limited duration and frequency, and the second switch acts as a back-up channel performing a slower response break pressure release action, the duration of brake pressure release pulses from the second switch being delayed by the first switch removing the deceleration threshold on the second switch via the control connection. The dual channel anti-lock brake control system forms the subject of our co-pending U.S. Patent Application Ser. No. 893,798 and a more detailed description is given therein.

The control system of FIG. 1 is shown in greater detail in FIG. 2, and operation of the system is illustrated in FIG. 3. The differentiator A1 is an operational amplifier connected as a fast linear differentiator producing an acceleration/deceleration signal $dVw/dt$ around a quiescent output voltage of $+3.0$ v applied via a bias circuit B comprising a resistor $R_B$ and diode $D_B$. Deceleration produces a positive swing of the output of A1, and incipient skid conditions are detected when the output voltage exceeds the threshold setting $dV1/dt$ on the comparator COMP1. The comparator then produces a brake pressure release pulse that energises the brake pressure release solenoid SOL, and also reduces the deceleration threshold on the second deceleration switch A2 by removing the current flowing through R1, thereby allowing early triggering of A2 once a preset wheel speed drop $\Delta V_w$ has been detected at time $t_o$ in FIG. 3. The second switch A2 then produces a brake pressure release pulse $V_p$ that maintains the solenoid SOL energised after the deceleration signal falls below the threshold $dV1/dt$, resetting the differentiator A1 at time t2 (curve 2) in FIG. 3. The capacitor C then starts to discharge at the rate $dV2/dt$, eventually causing the second switch A2 to reset at time t4 and terminate the brake pressure release pulse from A2.

The brake pressure release pulse $V_p$ from the second deceleration sensing switch A2 controls a charge storage circuit S (FIG. 1) so that this accumulates charge at a predetermined rate for the duration of the pulse. Once the potential corresponding to the accumulated charge in circuit S exceeds a predetermined level, circuit S is capable of producing a brake pressure release pulse that passes via the OR gate and amplifier AMP to energise the solenoid SOL. This pulse may extend beyond that from the second switch A2, thereby acting as an extension release pulse, the length of the pulse depending upon the potential developed in the charge storage circuit S as compared with a reference potential that varies with wheel acceleration, the reference potential being derived from the differentiator A1 of the first deceleration sensing switch via the bias circuit B. The potential from the circuit S therefore sets a wheel acceleration requirement that must be met, as judged by comparison with the reference potential, before the extension release pulse is terminated.

The charge storage circuit S comprises a capacitor $C_s$ that is connected in series with a resistor $R_c$, switch SW1 and the supply voltage $V_s$, and a resistor $R_D$ and a switch SW2 that are each connected in parallel with the capacitor $C_s$. The switches SW1 and SW2 are controlled by the brake pressure release pulse $V_p$ from the second deceleration sensing switch A2 so that switch SW1 is held closed and switch SW2 is held open by the pulse $V_p$, thereby causing the capacitor $C_s$ to be charged at a predetermined rate set by the resistors $R_c$ and $R_D$. The potential Vcs across the capacitor $C_s$ thus falls from the supply voltage level $V_s$, as shown in FIG. 3.

The charge storage circuit S also comprises a comparator COMP3 which compares the potential on the capacitor $C_s$ with the reference potential from the bias circuit B, which reference potential comprises the swing below the 3 volts bias potential of the signal $dVw/dt$ passed by the diode $D_B$ corresponding to wheel acceleration. If $V_{cs}$ falls below the reference potential, the comparator COMP3 produces a brake pressure release pulse $V_{PE}$. Thus, still considering the deceleration/acceleration curve 2 in FIG. 3, the comparator COMP3 produces a brake pressure release pulse $V_{PE}$ at time t1 when the potential $V_{cs}$ falls below the bias potential of 3 volts, then forming the reference potential. Wheel acceleration commences at time t3 and causes the reference potential to fall, but the reference potential has still not reached the potential $V_{cs}$ at time t4 when the second deceleration sensing switch A2 resets, terminating the brake pressure release pulse $V_p$. The comparator COMP3 thus continues to produce the brake pressure release pulse $V_{PE}$, but termination of the pulse $V_p$ at time t4 opens the switch SW1 so that charging of capacitor $V_{cs}$ stops. The switch SW2 is still held open by pulse $V_{PE}$ from the comparator COMP3, but capacitor $V_{cs}$ now discharges via the parallel resistor $R_D$ so that the potential $V_{cs}$ begins to rise at a predetermined rate as shown by the broken line in FIG. 3. At time t5, the rising potential $V_{cs}$ equals the falling reference potential and comparator COMP3 resets, terminating the extension release pulse $V_{PE}$ and closing switch SW2 to recharge the capacitor $C_s$ rapidly to the supply voltage $V_s$.

Thus, in the case of the deceleration/acceleration curve 2, the initial acceleration requirement corresponding to the final potential $V_{cs}$ on capacitor $C_s$, is not met by the falling reference potential at time t4 when the brake pressure release pulse $V_p$ terminates, and thus an extension brake pressure release pulse $V_{PE}$ is produced. After time t4, the initial acceleration requirement is allowed to fall at a predetermined rate until it is satisfied at time t5 by the increasing wheel acceleration producing the falling reference potential.

In the case of the deceleration/acceleration curve 1 in FIG. 3, the wheel speed dip is smaller than that of curve 2 and wheel speed recovery is more rapid following brake pressure release. In fact, at time t4' when the brake pressure release pulse $V_p$ terminates, the initial acceleration requirement corresponding to the potential $V_{cs}$ on capacitor $C_s$ is met by the reference potential and thus the pulse $V_{PE}$ from comparator COMP3 terminates at the same time and there is no brake release extension.

On the other hand, in the case of the deceleration/acceleration curve 3, the wheel speed dip is greater than in curves 1 and 2, and wheel speed recovery is slow. The extension, brake pressure release pulse $V_{PE}$ is therefore produced at time t4'' as in curve 2, but, because wheel acceleration is low, it never meets the reducing acceleration requirement of potential $V_{cs}$. The extension pulse $V_{PE}$ therefore continues until $V_{cs}$ decays to the bias voltage of 3 volts. This extension pulse $V_{PE}$ may be too long under certain conditions, resulting in brake reapplication being delayed beyond the synchronous speed and thereby lower braking efficiency.

In order to prevent very low wheel speed recovery causing over-extension of brake pressure release, a synchronous running detector SY (FIG. 1) is provided that detects a change from wheel acceleration to wheel deceleration and terminates brake pressure release. The detector SY comprises a comparator COMP2 that compares the deceleration/acceleration signal $dVw/dt$ with the bias potential of 3 volts and produces an output signal when $dVw/dt$ exceeds 3 volts, i.e. when wheel acceleration changes to deceleration. This output signal is applied to the reset terminal of a memory unit MEM that has the set terminal connected to the output of the second deceleration switch A2 so that the memory MEM is held set by the brake release pulse $V_p$ and then produces an inhibit signal that holds the switch SW2 open, and is reset by the signal from COMP2 only if $V_p$ is absent, whereupon the inhibit signal ceases and switch SW2 closes to charge capacitor $C_s$ to the supply voltage $V_s$ and terminate the extension, brake pressure release pulse $V_{PE}$ from comparator COMP3. This occurs at time t6 in the case of curve 3 in FIG. 3.

A second embodiment of the invention is illustrated in FIG. 4, which like the embodiment of FIGS. 1 and 2, comprises a first deceleration sensing switch with a fast response comprising a differentiator A1 and comparator COMP1, and a second deceleration sensing switch A2 with a slower response. The first switch produces a brake pressure release pulse at deceleration levels above a threshold $dV1/dt$, and this pulse passes via a pulse circuit P, an OR gate and amplifier AMP to energise a brake pressure release solenoid SOL. The second switch produces a brake pressure release pulse $V_p$ following a drop in wheel speed $\Delta Vw$ after its threshold $dV2/dt$ has been removed under the control of the first switch, and this passes via the OR gate and amplifier AMP to energise the solenoid SOL. The pulse $V_p$ is terminated under the control of the potential on its input capacitor C2. All of this will be understood from the description of the first embodiment. FIG. 5 shows a similar set of three wheel speed curves and three corresponding deceleration/acceleration curves. The brake pressure release pulse $V_p$ for the circuit of FIG. 4 is shown for curve 1 commencing at time tQ and terminating at time t3.

Also, as in the first embodiment, the brake pressure release pulse $V_p$ from the second deceleration switch A2 is used to control charging of a capacitor $C_s$, and the potential $V_{cs}$ on the capacitor $C_s$ is compared with a reference potential by a comparator COMP3 so that the latter produces an extension, brake pressure release pulse $V_{PE}$ as necessary. However, in this second embodiment of the invention, instead of the reference potential being varied in accordance with wheel acceleration, the capacitor $C_s$ is discharged in accordance with the wheel acceleration so that the potential $V_{cs}$ varies with acceleration and is compared with a fixed reference potential.

Referring now to FIG. 4, the capacitor $C_s$ is connected between the output of the second deceleration sensing switch A2 and the ground line via a resistor R13 and diode D2 so that the capacitor $C_s$ is charged towards the positive supply line voltage for the duration of the brake pressure release pulse $V_p$. The potential $V_{cs}$ on the capacitor $C_s$ is tapped via a resistor R14 and compared with a reference potential by the comparator COMP3, the reference potential being the potential $V_{REF}$ (FIG. 5) derived from the positive supply line via a resistor R16. Once the potential $V_{cs}$ exceeds the reference potential $V_{REF}$, the comparator COMP3 is triggered and produces a brake pressure release pulse $V_{PE}$ that passes via resistor R19, the OR gate and amplifier AMP to the solenoid SOL. This occurs at time t1 for curve 1 in FIG. 5. Once triggered the input current to comparator COMP3 via resistor R14 causes capacitor $C_s$ to discharge, but this effect is slight compared with the charging current.

The capacitor $C_s$ is also discharged in accordance with wheel acceleration via a transistor Q1 having its collector connected to the capacitor via a diode D3, its emitter connected to the output of the differentiator A1 via a resistor R24 and diode D4 so as to receive the deceleration/acceleration signal $dVw/dt$, and its base connected via a resistor R23 to a potential divider R4, R5, R6 that sets a threshold acceleration level $V_a$ (FIG. 5) above which the transistor Q1 will conduct. Above this threshold $V_a$, the base-emitter junction of the transistor is forward biassed and conducts to a level determined largely by the excess acceleration, a corresponding collector current being drawn from the capacitor $C_s$ that rapidly discharges the latter.

Considering curve 1 in FIG. 5, wheel acceleration reaches the threshold level $V_a$ at time t2 and thereafter causes the capacitor to discharge rapidly, as shown by the curve of the corresponding potential $V_{cs}$. Once the capacitor $C_s$ has been discharged down to a mid-range level set by resistor R16 and the positive feedback connection via resistor R15 and diode D6, the comparator COMP3 resets and terminates the extension release pulse $V_{PE}$. The mid-range level is set at 3 volts in FIG. 5 and COMP3 resets at time t4 for curve 1. The extension release pulse $V_{PE}$ therefore extends brake release to time t4 once the release pulse $V_p$ from the second switch terminates at time t3.

Curves 2 in FIG. 5, show conditions with a higher wheel speed dip and slower wheel speed recovery than for curves 1, and under these conditions the capacitor $C_s$ is discharged more slowly, thereby producing a longer extension release pulse $V_{PE}$ terminating at time t4'.

In the case of curve 3, wheel speed recovery is so slow that the acceleration threshold $V_a$ is not exceeded and transistor Q1 does not discharge the capacitor $C_s$. However, the decay current via resistor R14 produces a gradual fall in the potential $V_{cs}$ towards the 3 volt reset level.

In order to prevent over-extension of the brake release pulse in the conditions of curve 3, a synchronous running detector is provided to discharge the capacitor $C_s$ rapidly when very low wheel acceleration or deceleration is detected, thereby terminating the extension release pulse $V_{PE}$. The detector is formed by a comparator A5 that compares the deceleration/acceleration signal $dVw/dt$ from the differentiator A1 via a resistor R22, with a low acceleration or deceleration reference level from a potential divider R20, R21, and produces an output pulse when the reference level is exceeded. This output pulse passes via a capacitor C6 and diode D7 to the reset input of a latch comprising an amplifier A6 with positive feedback via a resistor R29. The latch A6 also has a set input connected via a resistor R30 to the output of the second deceleration sensing switch A2, and an output connected via a diode D5 to the emitter of transistor Q1.

FIG. 6 shows operation of the synchronous running detector A5 and latch A6. While the second deceleration sensing switch A2 produces the release pulse $V_p$, this pulse holds the latch A6 set. Thus, when wheel deceleration changes to acceleration at the bottom of the wheel speed dip and the comparator A5 is triggered, the pulse passed by capacitor C6 to the latch A6 does not reset the latter. However, after the pulse $V_p$ has terminated, the latch A6 is reset by the pulse produced by the comparator A5 when it resets as the wheel acceleration changes to a deceleration. Resetting of latch A6, causes it to produce a negative pulse that causes maximum conduction of transistor Q1 to discharge the capacitor $C_s$. Latch A6 is set again by the pulse $V_p$ from the second deceleration switch in the next skid cycle.

We claim:

1. An anti-lock brake control system for vehicles with braked wheels comprising a wheel speed sensor for producing a signal proportional to wheel speed; a first switch having an input connected to the sensor to receive the wheel speed signal and being adapted to respond to the rate of change of said signal so as to produce a first control pulse to effect brake pressure release while a preset first wheel deceleration threshold is exceeded; a second switch that is triggered under the control of a first control pulse and which, when triggered initiates a second control pulse to effect brake pressure release; a first charge storage device that receives the wheel speed signal so that it accumulates a charge dependent on the dip in wheel speed and discharges in response to wheel speed recovery following said dip in wheel speed, and which is associated with the first and second switches so that it discharges in a predetermined manner after the first control pulse terminates and terminates the second control pulse when the stored charge falls to a predetermined level, a second charge storage device which is adapted so that it charges in a predetermined progressive manner while the brake pressure release pulse is produced and discharges at a predetermined decay rate, comparator means that compares the potential on the second charge storage device with a reference potential and produces an extension brake pressure release pulse according to their relative values, and means to vary one of said potentials in a manner dependent on acceleration of the wheel above a preset acceleration threshold so that the extension brake pressure release pulse is terminated by increasing wheel acceleration.

* * * * *